United States Patent
Foerg et al.

(10) Patent No.: US 7,615,275 B2
(45) Date of Patent: Nov. 10, 2009

(54) FLAT MATERIAL FOR LEADTHROUGHS

(75) Inventors: Christian Foerg, Dillishausen (DE);
Herbert Muenzenberger, Wiesbaden (DE); Heiri Nuesch, Sevelen (CH)

(73) Assignee: Hilti Aktiengesellschaft, Schaan (LI)

( * ) Notice: Subject to any disclaimer, the term of this patent is extended or adjusted under 35 U.S.C. 154(b) by 222 days.

(21) Appl. No.: 11/640,070

(22) Filed: Dec. 14, 2006

(65) Prior Publication Data
US 2007/0148394 A1   Jun. 28, 2007

(30) Foreign Application Priority Data
Dec. 23, 2005   (DE) .................... 10 2005 000 208

(51) Int. Cl.
*B32B 3/16* (2006.01)
*B32B 5/04* (2006.01)
(52) U.S. Cl. .................. 428/190; 428/55; 428/56; 428/77; 428/920; 428/921; 442/20; 442/43; 442/45; 442/58; 52/232; 277/602; 277/603; 277/314

(58) Field of Classification Search ............... 428/55, 428/56, 77, 190, 920, 921; 442/20, 43, 45, 442/58; 52/232; 277/602, 603, 314
See application file for complete search history.

(56) References Cited

U.S. PATENT DOCUMENTS

| | | | | |
|---|---|---|---|---|
| 3,692,619 | A | * | 9/1972 | Wedekind et al. ........... 428/190 |
| 4,645,697 | A | * | 2/1987 | Torigoe ..................... 428/43 |
| 2005/0170221 | A1 | * | 8/2005 | Kim et al. ................... 428/911 |

* cited by examiner

*Primary Examiner*—Alexander Thomas
(74) *Attorney, Agent, or Firm*—Abelman, Frayne & Schwab

(57) ABSTRACT

A flat material (10) for forming leadthroughs and including a first layer 911) formed of strip-shaped plates (14) adjoining each other along their narrow sides and separated from each other by a slot (15), a second layer (13) formed of an elastic material, and an intermediate layer (12) located between the first layer (11) and the second layer (13).

6 Claims, 1 Drawing Sheet

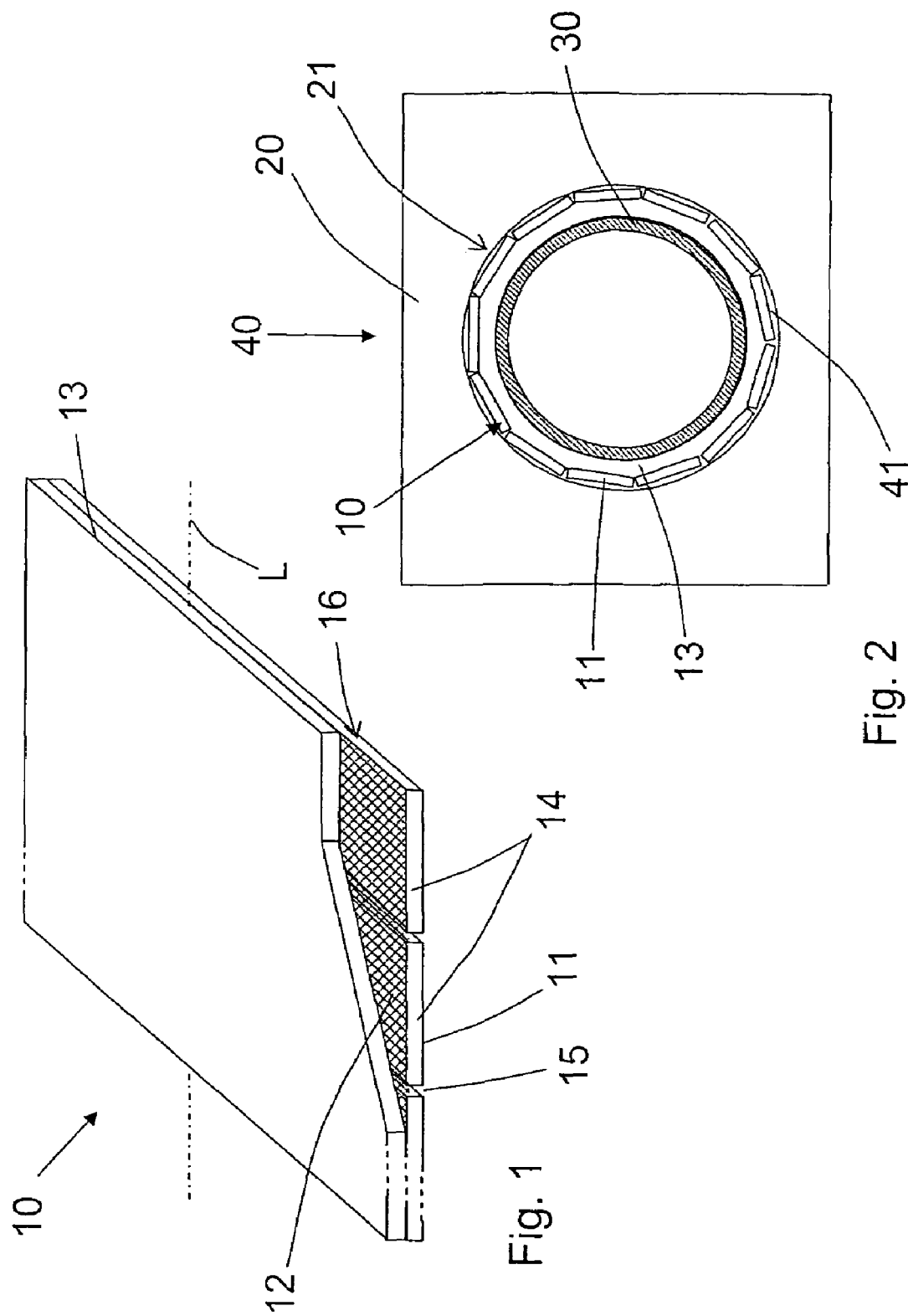

FLAT MATERIAL FOR LEADTHROUGHS

BACKGROUND OF THE INVENTION

1. Field of the Invention

The present invention relates to a flat material for leadthroughs.

2. Description of the Prior Art

A leadthrough flat material is used for lining up of inner walls of openings formed in constructional components such as, e.g., walls or ceilings through which pipes, cables, cable channels and the like are extendable.

With such leadthroughs, an opening, which is formed in a constructional component, is lined up with a protective or clad tube. Through this protective or clad tube, a conduit is inserted and is sealed relative to the protective tube.

German Publication DE 103 13 305 A discloses a clad tube for forming leadthroughs which is formed of a substantially cylindrical basic tube surrounded with a plurality of circumferentially arranged lamellas and having at its opposite end regions, sections, respectively, having a larger diameter.

A drawback of such protective or clad tubes consists in that they can be used only for forming leadthroughs having a certain diameter, i.e., the diameter of the clad tube should correspond to the size of the opening.

Accordingly, an object of the present invention is to provide a material for leadthroughs with which the above-mentioned drawback is eliminated and which is flexible in use, i.e., is capable to accommodate opening with different sizes.

SUMMARY OF THE INVENTION

This and other objects of the present invention, which will become apparent hereinafter, are achieved by providing a flat material having a first layer formed of strip-shaped plates adjoining each other along their narrow sides and separated from each other by a slot, a second layer formed of an elastic material, and an intermediate layer located between the first and second layers.

With slots provided between the rigid strip-shaped plates, protective tube for leadthroughs having different sizes, can be easily formed by folding or bending the flat material. Upon bending the flat material to form a tube, the slots between adjacent plates become closed. Further, the flat material can be easily cut at the slots between the adjacent strip-shaped plates, whereby pieces of different length can be produced. Still further, the inventive flat material permits to form protective tubes for leadthroughs, which can be easily separated in a plurality of sections because the inventive flat material is easily foldable along the slots. Thus, separation of conduit junctions in the leadthrough becomes possible.

The strip-shaped plates have, advantageously, a width from 10 to 50 mm, preferably, from 15 to 25 mm.

Advantageously, the intermediate layer is formed of a little stretchable material having the maximum yield limit of about 10%. Thereby, the intermediate layer prevents, in particular, the second layer, which is formed of an elastic material, from overstretching or even splitting during mounting. However, the little stretchable material should be easily bendable to insure a good rolling-up of the flat material.

The little stretchable material is advantageously formed as a fabric. Preferably, the little stretchable material is formed as a glass fiber fabric that has a high tensile strength and, simultaneously, a satisfactory bending characteristics. Alternatively, the little stretchable material can be formed as metal cloth.

Advantageously, the elastic material of the second layer is formed as an elastic coating which is applied, during the manufacturing of the flat material on the first layer with the intermediate layer lying thereon. Alternatively, the elastic material can be formed preliminary as a band to be, e.g., glued to the first layer with the intermediate layer.

It is further advantageous when the elastic material of the second layer is formed as an intermescent coating material. Thereby, a conduit that passes through a protective tube formed of the inventive flat material, can be sealed directly by the protective tube in case of fire.

A high thermal and mechanical bearing capacity of the inventive flat material is achieved by forming the strip-shaped plates of sheet steel.

Advantageously, the inventive flat material is formed as a continuous material that can be cut to length. This insures a cost-effective manufacturing of the inventive flat material and its flexible use. The inventive flat material can, thus, be made available in form of wound-up rolls.

The novel features of the present invention, which are considered as characteristic for the invention, are set forth in the appended claims. The invention itself, however, both as to its construction and its mode of operation, together with additional advantages and objects thereof, will be best understood from the following detailed description of the preferred embodiment, when read with reference to the accompanying drawings.

BRIEF DESCRIPTION OF THE DRAWINGS

The drawings show:

FIG. 1 a perspective partially cross-sectional view of a flat material according to the present invention for leadthroughs; and FIG. 2 an elevational view showing a leadthrough located in a constructional component with a pipe arranged in the leadthrough.

DETAILED DESCRIPTION OF THE PREFERRED EMBODIMENT

A flat material 10 according to the present invention for forming leadthroughs for conduits and the like, which is shown in FIG. 1, is formed as a rolled-up continuous material. The flat material 10 is formed of three layers. The first layer 11 is formed of metal strip-shaped plates 14 such as, e.g., steel metal plates or aluminum metal plates that extend parallel to each other and transverse to a longitudinal direction L of the flat material 10. The strip-shaped plates have a width of 25 mm. The second layer 13 is formed of an elastic intumescent material formed as a coating provided on the first layer 11. The elastic intumescent material consists, e.g., of a matrix of latex, acrylate, polyurethane, or another elastic plastic material and into which intermescent components such as, e.g., swelling graphite, are brought in.

Between the first layer 11 and the second layer 13, there is further provided an intermediate layer 12 formed of a little stretchable material with a yield limit of about 5%, such as, e.g., a wide-meshed glass fiber fabric. Instead of the glass fiber fabric, e.g., a plastic or natural fiber fabric, plastic foil, or a multiplicity of threads, cords, or straps of a plastic glass, or natural fiber which extend parallel to each other in the longitudinal direction L of the flat material, can be used. The little stretchable material can also consist of a knitted plastic, natural, or glass fiber material. Under natural fibers, fibers or yarns of cotton, wool, linen, or plant fibers such as, e.g., jute or sisal, are understood.

Because of slots 15 provided between the strip-shaped plates 14 of the first layer 11, the flat material 10 is easily rolled up in its longitudinal direction L and, thus, can be made available in form of rolls (not shown in the drawings). Further, the slots 15 insure that the flat material 10 can be easily bent, folded, or separated thereat.

FIG. 2 shows a leadthrough 40 formed by cutting the inventive flat material 10 to a length corresponding to an inner circumference of an opening 21 and forming a clad tube therefrom. The flat material 10 lines up the opening 10 in a constructional component 20, e.g., a wall. A sealing mass 41 fills the space between the inner wall of the opening 21 and the first layer 11 of the flat material 10 to fill remaining intermediate cavities and gaps. The sealing mass 41 can be formed, e.g., as an intumescent mass. A conduit 30, which is formed, e.g., as a pipe conduit, passes through the leadthrough 40 and sealingly abuts the second layer 13 that is formed of an elastic material.

If, as a result of the shape of the pipe conduit 30, the second layer 13 does not tightly abut the pipe conduit 30, the sealing mass 41 is used for filling any gaps. Besides any intumescent sealing mass, plaster or mortar can also be used.

Though the present invention was shown and described with references to the preferred embodiment, such is merely illustrative of the present invention and is not to be construed as a limitation thereof and various modifications of the present invention will be apparent to those skilled in the art. It is therefore not intended that the present invention be limited to the disclosed embodiment or details thereof, and the present invention includes all variations and/or alternative embodiments within the spirit and scope of the present invention as defined by the appended claims.

What is claimed is:

1. A flat material (10) for forming leadthroughs, comprising:
    a first layer (11) formed of strip-shaped plates (14) arranged adjacent to each other along elongate narrow sides thereof, extending parallel to each other in a direction transverse to a longitudinal direction (L) and over an entire width of the flat material and separated from each other by a slot (15) a width of which is reduced upon bending of the flat material;
    a second layer (13) formed of an elastic material; and
    an intermediate layer (12) located between the first layer (11) and the second layer (13),
    wherein the intermediate layer (12) is formed of a stretchable material having a maximum yield limit of about 10%.

2. A flat material according to claim 1, wherein the stretchable material is a fabric.

3. A flat material according to claim 1, wherein the stretchable material is a glass fiber fabric.

4. A flat material (10) for forming leadthroughs, comprising:
    a first layer (11) formed of strip-shaped plates (14) arranged adjacent to each other along elongate narrow sides thereof, extending parallel to each other in a direction transverse to a longitudinal direction (L) and over an entire width of the flat material and separated from each other by a slot (15) a width of which is reduced upon bending of the flat material;
    a second layer (13) formed of an elastic material; and
    an intermediate layer (12) located between the first layer (11) and the second layer (13),
    wherein the elastic material of the second layer (13) is an intumescent coating material.

5. A flat material (10) for forming leadthroughs, comprising:
    a first layer (11) formed of strip-shaped plates (14) arranged adjacent to each other along elongate narrow sides thereof, extending parallel to each other in a direction transverse to a longitudinal direction (L) and over an entire width of the flat material and separated from each other by a slot (15) a width of which is reduced upon bending of the flat material;
    a second layer (13) formed of an elastic material; and
    an intermediate layer (12) located between the first layer (11) and the second layer (13),
    wherein the strip-shaped plates (14) are formed of metal.

6. A flat material according to claim 5, wherein the strip-shaped plates (14) are formed of sheet steel.

* * * * *